May 20, 1930.                M. P. WHITNEY                1,759,076
                              ENGINE STARTER
                           Filed July 15, 1927           3 Sheets-Sheet 1
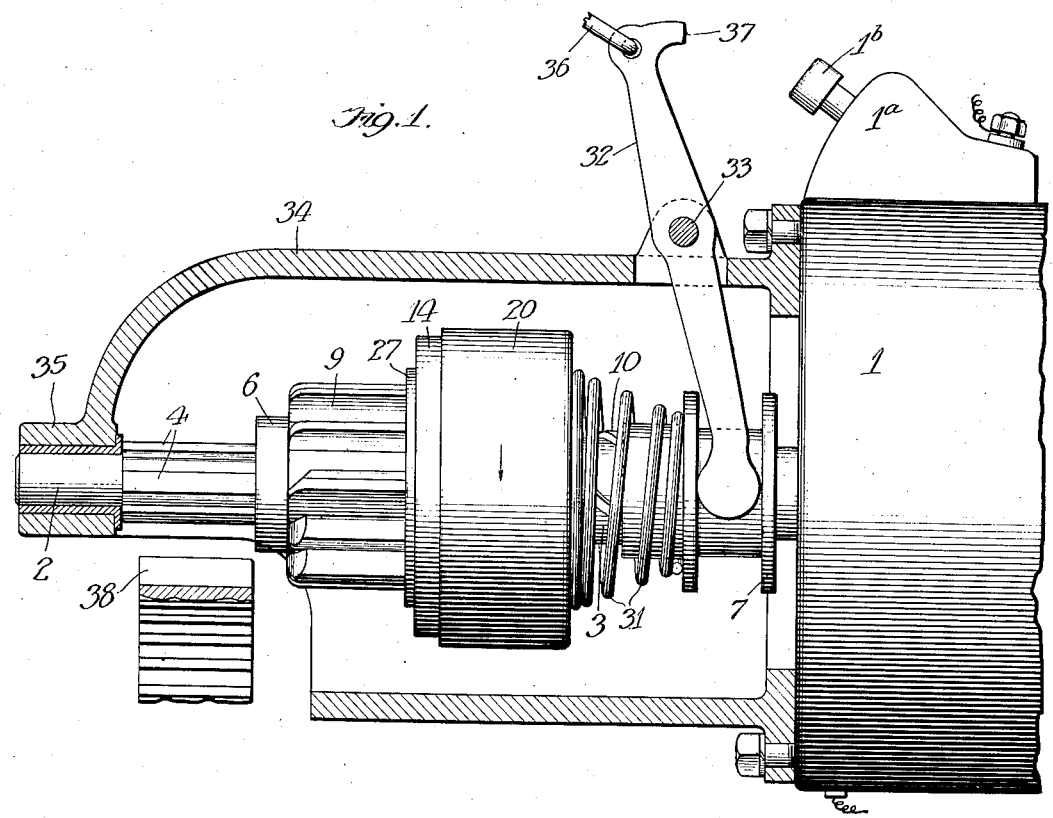
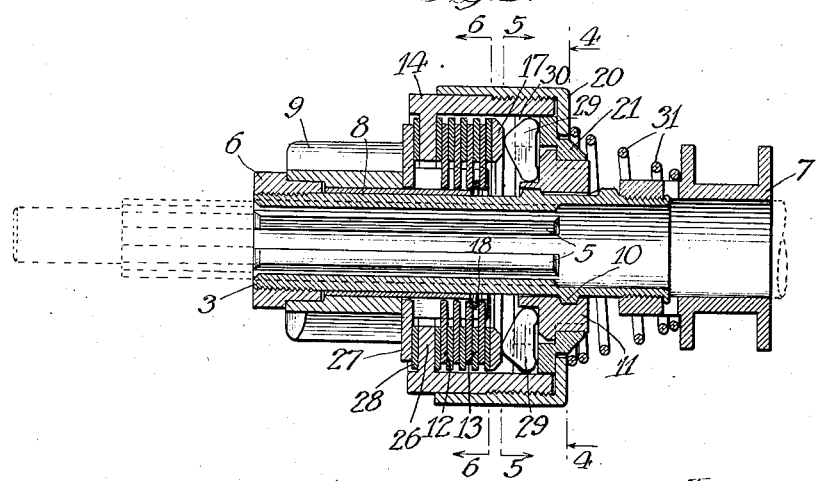

May 20, 1930. M. P. WHITNEY 1,759,076
ENGINE STARTER
Filed July 15, 1927 3 Sheets-Sheet 3
Fig. 9.
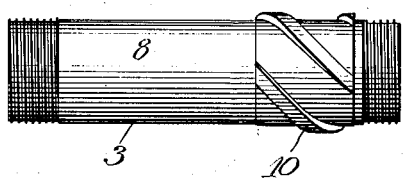
Fig. 10. Fig. 11.
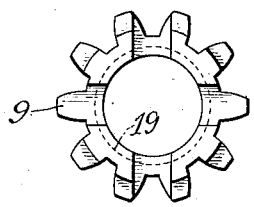 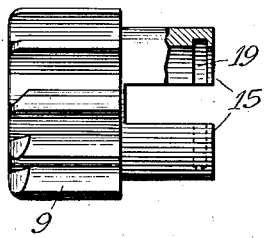
Fig. 12. Fig. 13. Fig. 14.
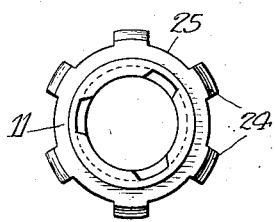 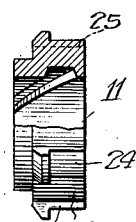 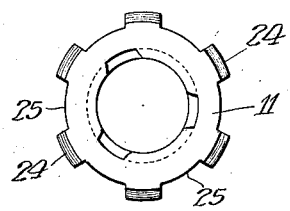
Fig. 15. Fig. 16. Fig. 17.
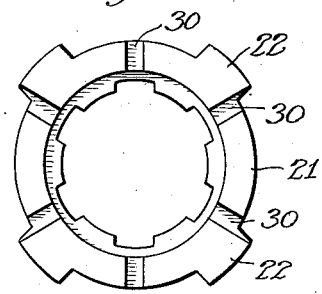 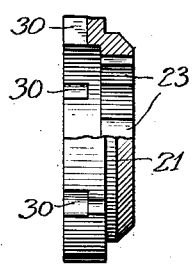 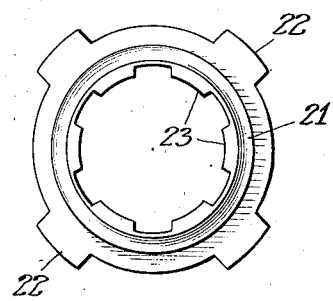
Fig. 18.
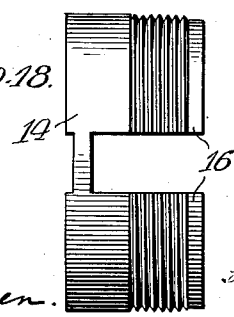
Witness
Martin H. Olsen.
Inventor
Maurice P. Whitney
By Redw. Skibben Davis & Macauley
His Attys.

Patented May 20, 1930

1,759,076

UNITED STATES PATENT OFFICE

MAURICE P. WHITNEY, OF ELMIRA, NEW YORK, ASSIGNOR TO ECLIPSE MACHINE COMPANY, OF ELMIRA, NEW YORK, A CORPORATION OF NEW YORK

ENGINE STARTER

Application filed July 15, 1927. Serial No. 205,902.

My invention has relation to means for starting or cranking an engine such as an internal combustion engine and more particularly to that part of such a starting means or apparatus known as the drive or transmission which transmits the power of a prime mover such as an electric motor to a part or member of the engine to be started such as the flywheel thereof. My invention represents an improvement upon the starting apparatus or drive made the subject matter of the application of William L. McGrath, filed January 23, 1924, Serial No. 688,077 for Improvements in engine starters and the particular object involved in such improvement is the provision of means for multiplying the pressure from the control member or nut in order to give greater pressure upon the plates of the friction clutch for the same torque input, everything else being equal. Other features of novelty and utility will be apparent from the description hereinafter given.

In the drawings Figure 1 is an elevation of an engine starter embodying my invention but showing the enclosing casing in section;

Fig. 2 is a longitudinal section of the drive or transmission proper;

Figure 3:
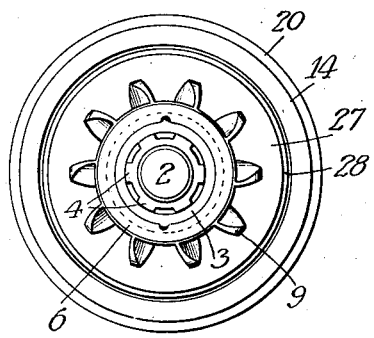
Fig. 3 is an end elevation of such drive.
Figure 4:
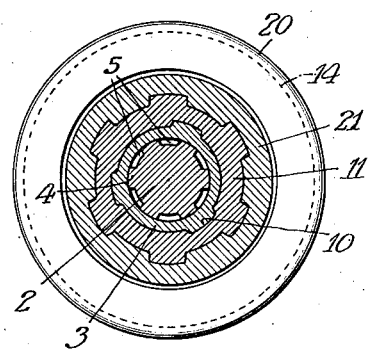
Figs. 4, 5 and 6 are cross sections on the corresponding section lines of Fig. 2.
Figure 5:
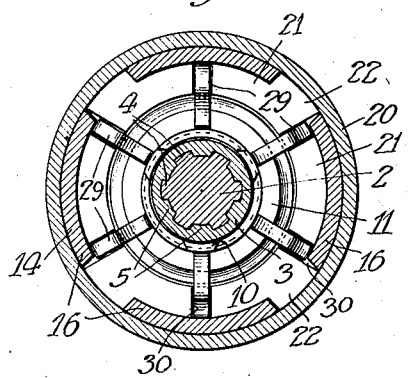
Figure 6:
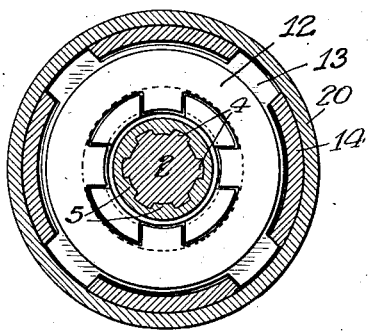
Figure 7:
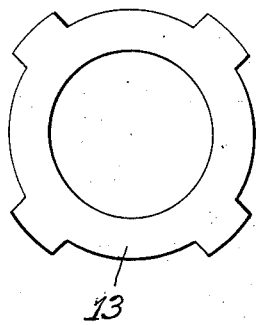
Figure 8:
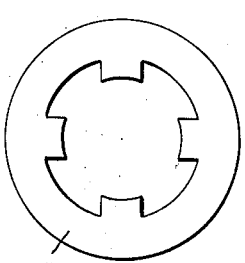

Figs. 7 and 8 detail views of a member of each set of clutch plates;

Fig. 9 is an elevation of the screw shaft alone;

Figs. 10 and 11 are elevations in two different positions of the pinion alone;

Figs. 12, 13 and 14 detail views of the control member or nut alone;

Figs. 15, 16 and 17 detail views of the fulcrum ring which is associated with the control member; and Fig. 18 a detail view of the main portion of the barrel.

For the purpose of a clear and definite disclosure of my invention I have shown the same embodied in a certain specific structure, but it will be understood that such invention may be embodied in structures of somewhat different formation and arrangement without departing from the spirit and scope of my invention.

Referring to the particular embodiment of my invention as illustrated in the drawings, the prime mover is an electric motor 1 and as such embodiment herein is of the direct drive type, such motor is provided with an extended armature shaft 2 on which the drive or transmission is mounted and by which it is driven. This motor has a suitable switch and electrical connections, such switch being indicated at 1$^a$ and the switch button at 1$^b$.

The drive or transmission is formed as an assembly which is readily applicable to and detachable from such extended armature shaft 2. This drive assembly comprises, in the present instance, a shaft which is in the form of a sleeve 3 (shown separately in Fig. 9), and which is mounted upon the armature shaft for rotary movement therewith and longitudinal movement thereof through a suitable medium as for instance the series of splines 4 on the armature shaft with their intervening grooves and the series of corresponding splines 5 and their intervening grooves in the bore of the sleeve 3. To one end of the sleeve 3 there is secured, as by threading thereon, a stop nut 6 and at the other end, and also preferably by threading thereon a shifter sleeve 7. The sleeve 3 has a smooth surface portion 8 on which slides the driving member which is here in the form of a pinion 9 and it is also provided towards one end with coarse or long lead screw threads 10, by which the actuating or control member 11 is operatively connected with the screw shaft by being threaded thereto for longitudinal movement thereof and rotary movement therewith.

The control member 11, hereinafter conveniently called a nut, is operatively connected with the pinion by means of a friction clutch whereby the torque of the starting motor is transmitted from the screw shaft or sleeve and the nut to the pinion and thence to the flywheel of the engine when the pinion is in cranking position. The clutch mechanism herein shown comprises two sets of clutch plates 13 and 12, the members of which alternate and which are connected respectively to the pinion 9 and driving drum or barrel 14. The plates 12 interlock with the tongues 15 of the pinion and their intervening slots and the plates 13 interlock with the tongues 16 of the barrel or drum 14 and their intervening slots as illustrated in Figs. 2, 6, 11 and 18. A washer or pressure ring 17 is interposed between the innermost plate 12 and the cams hereinafter referred to. In order to hold the friction plates in assembled position with respect to the pinion, a locking wire 18 is positioned in a circumferential groove 19 in the tongues 15 of such pinion.

The barrel is here formed as the barrel proper 14 and also an end cap portion 20 screwing thereon when the parts are assembled within the barrel. This barrel is operatively connected with the nut by means of an irregular shaped ring 21 which is interlocked at its upper portion with the interior of the barrel 14 and with the exterior of the nut 11 as illustrated in Figs. 2, 14 and 17, the outer interlocking tongues of the ring being shown at 22 and the inner tongues thereof at 23, and the interlocking tongues of the nut being indicated at 24 and the longitudinal grooves thereon at 25. By the provision of such grooves 25 the nut is capable of a slight longitudinal movement relative to the ring 21. This ring is made of the shape shown in order that it may be thus interlocked with the nut and also take its position as to its upper portion within the inturned end flange of the cap 20. The barrel proper is provided with an inturned flange 26 at its outer or left-hand end the same representing an abutment or pressure flange bearing against the left-hand or outermost one of the friction plates. Between this flange 26 and the right-hand end of the teeth of the pinion there are interposed a washer 27 interlocked with the tongues 15 of the pinion and a friction plate 28 interlocked with the drum 14, thus providing a supplementary friction clutch of relatively low torque-transmitting capacity.

Between the control member and the friction clutch, specifically between the nut 11 and pressure ring 17 there is interposed the pressure multiplying means constituting the main feature of my invention. As shown the same comprises a series of cams which are plates 29 of irregular shape more nearly approaching a triangle than any other shape with the apex thereof bearing against the ring 17 and the inner end against the nut 11 and the upper end as a fulcrum against the inner face of the upper portion of the ring 21. These cams are received at their outer ends in slots 30 formed in the ring 21 radially thereof, Figs. 15 and 16, whereby such cams are held in position for their proper functioning as shown in Fig. 2.

A spring 31 of light tension is interposed between the flange of the shifter 7 and the barrel and consequently the barrel flange 26 is constantly urged towards the pinion by a light pressure, thereby normally tensioning the supplementary clutch 26, 28, 27 and frictionally connecting the pinion with nut 11 through such clutch and the interlocking connection of such nut with the ring 21 and the interlocking connection between this ring and the barrel.

The means for manually or pedally operating for shifting the drive (hereinafter for convenience called manually operated means) may be of any suitable construction and as shown herein in Fig. 1 the same comprises a spring pressed lever 32 which is pivoted at 33 to an extension casing 34 of the motor frame in whose outer ends there is provided a bearing 35 for the armature or driving shaft 2. The lower end of this lever 32 extends between the parallel flanges of the shifter 7 whereby the latter and the entire assembly attached thereto may be shifted in longitudinal direction along the driving shaft 2. This lever 32 extends within convenient reach of the driver or operator and is operated by any suitable connections or linkage which is not shown except for a portion of a link or rod 36. The upper end of the lever is extended laterally to form a branch arm 37 in whose path of movement a switch button 1$^b$ of the motor is arranged so that in the oscillation of the lever 32 in a clockwise direction such switch is operated and the drive assembly is shifted.

Describing a cycle of operation, and beginning with the parts in their normal position shown in Fig. 1, when it is desired to crank and start the engine the lever 32 is actuated by the operator in a clockwise direction whereupon the drive assembly will be shifted longitudinally along the driving shaft 2 to the left so as to mesh the pinion with the flywheel which is indicated at 38. Substantially at the time when the pinion is in full mesh with the flywheel or somewhat prior thereto if desired, the switch button 1$^b$ is contacted and operated by the branch arm 37 of the lever 32, the construction and arrangement of which parts are such that the proper timing of the actuation of this switch is obtained. The motor is now energized and the nut 11 will be advanced longitudinally to the left by reason of the screw threaded connection between it and the screw shaft or sleeve. The result of this movement of the nut is to oscillate the inner ends of the cams 29 in a clockwise direction, that is to move such inner ends towards the left, the outer ends of these cams fulcruming on the ring 21 and the apices thereof bearing against the ring 17 and forcing the clutch plates together with a considerable pressure which is the pressure of the nut multiplied by the provision of these cams. The torque of the motor will now be transmitted from the shaft 2, screw sleeve 3, nut 4, cams 29 and friction clutch to the pinion and consequently from thence to the flywheel for cranking the same and starting the engine.

When the engine starts on its own power and the flywheel rotates the pinion which now becomes the driven member, the screw jack action of the nut 11 will be relieved and likewise the frictional resistance or pressure between the clutch plates due to the action of the nut and cams will be relieved, with the result that the pinion will be driven freely. When the operator removes the pressure upon the lever 32 such shifting means and the drive assembly will be restored to normal position and the pinion and flywheel will be thereupon disengaged.

I claim:

1. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member, and means for multiplying the pressure of the control member upon the clutch.

2. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member and comprising a series of clutch plates, and means for multiplying the pressure of the control member upon the clutch plates.

3. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member and lever means interposed between the clutch and the control member for multiplying the pressure of the control member upon the clutch.

4. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member and a series of levers interposed between the clutch and the control member and actuated by the longitudinal movement of the control member for multiplying the pressure of the control member upon the clutch.

5. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member, and a series of levers disposed concentrically of the shaft and radially of its axis and interposed between the clutch and the control member for multiplying the pressure of the control member upon the clutch.

6. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member, and a series of levers interposed between the control member and the clutch, each lever having one end bearing against the control member and the other end fulcrumed, and an intermediate part bearing against the clutch, whereby the pressure of the control member upon the clutch is mutiplied.

7. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member, a fulcrum ring which has a fixed position longitudinally with respect to the driving member and clutch, and with respect to which the control member has a relative movement, and a series of levers interposed between the control member and clutch, each lever having one end bearing against the control member and the other end fulcrumed against said fulcrum ring, and an intermediate part bearing against the clutch, whereby the pressure of the control member upon the clutch is multiplied.

8. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member, a fulcrum ring which has a fixed position longitudinally with respect to the driving member and clutch, and with respect to which the control member has a relative movement, and a series of substantially triangular shaped plates interposed between the control member and clutch, each plate having its corners bearing respectively against the control member, clutch and fulcrum plate whereby the pressure of the control member upon the clutch is multiplied.

9. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member, a fulcrum ring which has a fixed position longitudinally with respect to the driving member and clutch, and with respect to which the control member has a relative movement, and a series of levers interposed between the control member and clutch, each lever having one end bearing against the control member and the other end fulcrumed against said fulcrum ring, and an intermediate part bearing against the clutch, whereby the pressure of the control member upon the clutch is multiplied, said ring having a series of slots which receive the fulcrum ends of the levers.

10. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member, a fulcrum ring which has a fixed position longitudinally with respect to the driving member and clutch, and with respect to which the control member has a relative movement, and a series of levers interposed between the control member and clutch, each lever having one end bearing against the control member and the other end fulcrumed against said fulcrum ring, and an intermediate part bearing against the clutch, whereby the pressure of the control member upon the clutch is multiplied, said ring being concentric of the control member and splined thereto.

11. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member and comprising a series of clutch plates, a barrel, said plates being operatively connected with the driving member and barrel respectively, and means for multiplying the pressure of the control member upon the clutch plates.

12. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member and comprising a series of clutch plates, a barrel, said plates being operatively connected with the driving member and barrel respectively, and a series of levers contained within the barrel and interposed between the control member and the clutch plates for multiplying the pressure of the control member upon the clutch plates.

13. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member, and comprising a series of clutch plates, a barrel having at one end an internal flange which bears on one side against the driving member and against whose other side the clutch plates bear, and a series of levers contained within the barrel and interposed between the control member and the clutch plates for multiplying the pressure of the control member upon the clutch plates.

14. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member, and comprising a series of clutch plates, a barrel having at one end an internal flange which bears on one side against the driving member and against whose other side the clutch plates bear, a fulcrum ring which is arranged at the other end of the barrel and with respect to which the control member has relative movement longitudinally, and a series of levers contained within the barrel and interposed between the clutch plates and the control member and ring for multiplying the pressure of the control member upon the clutch plates.

15. An engine starter drive including a rotatable shaft mounted for longitudinal and rotary movements, a driving member mounted on the shaft and adapted to engage a member of the engine to be started, a control member mounted on the shaft for longitudinal movement thereof and rotary movement therewith, a friction clutch between the control member and the driving member, means for multiplying the pressure of the control member upon the clutch and yielding means constantly urging the control member towards the clutch.

16. An engine starter drive including a rotatable shaft mounted for longitudinal and rotary movements, a driving member mounted on the shaft and adaptd to engage a member of the engine to be started, a control member mounted on the shaft for longitudinal movement thereof and rotary movement therewith, a friction clutch between the control member and the driving member and comprising a series of clutch plates, a barrel, said plates being operatively connected with the driving member and barrel respectively, and a series of levers contained within the barrel and interposed between the control member and the clutch plates for multiplying the pressure of the control member upon the clutch plates and yielding means constantly urging the control member towards the clutch.

17. An engine starter drive including a rotatable shaft, a sleeve mounted thereon for longitudinal movement thereof and rotary movement therewith, a pinion mounted loosely upon the sleeve, a nut threaded upon the sleeve for longitudinal movement thereof and rotary movement therewith, a friction clutch interposed between the pinion and nut, and means between the clutch and nut for multiplying the pressure of the nut upon the clutch.

18. An engine starter drive including a rotatable shaft, a sleeve mounted thereon for longitudinal movement thereof and rotary movement therewith, a pinion mounted loosely upon the sleeve, a nut threaded upon the sleeve for longitudinal movement thereof and rotary movement therewith, a friction clutch interposed between the pinion and nut, means between the clutch and nut for multiplying the pressure of the nut upon the clutch, means for shifting the sleeve and associated parts longitudinally along the shaft and yielding means constantly urging the nut towards the pinion and clutch.

19. An engine starter drive including a rotatable shaft, a sleeve mounted thereon for longitudinal movement thereof and rotary movement therewith, a pinion mounted loosely upon the sleeve, a nut threaded upon the sleeve for longitudinal movement thereof and rotary movement therewith, a barrel, a friction clutch therein comprising a series of clutch plates, one set being connected with the pinion and the other set with the barrel, and a series of levers arranged between the clutch and the nut.

20. An engine starter drive including a rotatable shaft, a sleeve mounted thereon for longitudinal movement thereof and rotary movement therewith, a pinion mounted loosely upon the sleeve, a nut threaded upon the sleeve for longitudinal movement thereof and rotary movement therewith, a barrel, a friction clutch therein comprising a series of clutch plates, one set being connected with the pinion and the other set with the barrel, a fulcrum ring arranged at one end of the barrel, and a series of levers fulcrumed upon such ring and interposed between the clutch and nut.

21. An engine starter drive including a rotatable shaft, a sleeve mounted thereon for longitudinal movement thereof and rotary movement therewith, a pinion mounted loosely upon the sleeve, a nut threaded upon the sleeve for longitudinal movement thereof and rotary movement therewith, a barrel, a friction clutch thereon comprising a series of clutch plates, one set being connected with the pinion and the other set with the barrel, a series of levers arranged between the clutch and the nut, yielding means constantly urging the nut toward the clutch and pinion, and means for shifting the sleeve and associated parts longitudinally along the shaft.

22. An engine starter drive including a rotatable shaft, a sleeve mounted thereon for longitudinal movement thereof and rotary movement therewith, a pinion mounted loosely upon the sleeve, a nut threaded upon the sleeve for longitudinal movement thereof and rotary movement therewith, a friction clutch interposed between the pinion and nut, and means between the clutch and nut for multiplying the pressure of the nut upon the clutch the threads of the shaft and pinion being of the long lead type.

23. An engine starter drive including a rotatable shaft mounted for longitudinal and rotary movements, a driving member mounted on said shaft for longitudinal movement therewith and rotation relative thereto and adapted to engage a member of the engine to be started, a control member mounted on said shaft for longitudinal movement thereof and rotary movement therewith, a main friction clutch operatively interposed between said driving member and control member and tension-controlled by the latter, and a supplementary friction clutch also interposed between said members and having normal tensioning means extraneous to said control member.

24. An engine starter drive including a rotatable shaft mounted for longitudinal and rotary movements, a driving member mounted on said shaft for longitudinal movement therewith and rotation relative thereto and adapted to engage a member of the engine to be started, a control member mounted on said shaft for longitudinal movement thereof and rotary movement therewith, a main friction clutch operatively interposed between said driving member and control member and tension-controlled by the latter, and a supplementary friction clutch of less torque-transmitting capacity than said main clutch also interposed between said members and normally spring-tensioned extraneously to said control member.

25. An engine starter drive including a rotatable shaft mounted for longitudinal and rotary movements, a driving member mounted on said shaft for longitudinal movement therewith and rotation relative thereto and adapted to engage a member of the engine to be started, a control member mounted on said shaft for longitudinal movement thereof and rotary movement therewith, a main friction clutch operatively interposed between said driving member and control member, means for multiplying the pressure of the control member upon said main clutch, a supplementary friction clutch also interposed between said members, and a spring normally tensioning said supplementary clutch.

In testimony whereof, I have subscribed my name.

MAURICE P. WHITNEY.